United States Patent [19]

Bains

[11] Patent Number: 4,881,224
[45] Date of Patent: Nov. 14, 1989

[54] FRAMING ALGORITHM FOR BIT INTERLEAVED TIME DIVISION MULTIPLEXER

[75] Inventor: Kuldip S. Bains, Watertown, Conn.

[73] Assignee: General DataComm, Inc., Middlebury, Conn.

[21] Appl. No.: 259,803

[22] Filed: Oct. 19, 1988

[51] Int. Cl.$^4$ ............................................. H04J 3/16
[52] U.S. Cl. ....................................... 370/82; 370/84
[58] Field of Search .................. 370/84, 85, 94, 122, 370/82; 340/825.5

[56] References Cited

U.S. PATENT DOCUMENTS

| | | | |
|---|---|---|---|
| 4,617,658 | 10/1986 | Walters | 370/84 |
| 4,641,303 | 2/1987 | Rogl | 370/84 |
| 4,698,801 | 10/1987 | Hatano et al. | 370/84 |

Primary Examiner—Joseph A. Orsino
Assistant Examiner—Frank M. Scutch, III
Attorney, Agent, or Firm—David P. Gordon

[57] ABSTRACT

Methods are provided for multiplexing a plurality of channels on to a sub-aggregate of an aggregate line so as to substantially minimize total frame length. In a preferred method, channel data rates are expressed as a sum of a plurality of predetermined subchannel data rates, and the number of times each predetermined subchannel data rate is used to express a channel data rate of a channel to be multiplexed is accumulated. Given a predetermined primary frame rate (P) such as 8Khz for a DACs compatible multiplexer, and a tertiary frame rate (T) chosen as the greatest common denominator of the subchannel data rates, an optimal secondary frame rate (S) may be found by minimizing for a plurality of different secondary frame rates the sum of (P/S) F1 plus (S/T)F2, where F1 represents the number of calls of the primary frame to the secondary frame, and F2 represents the number of calls of the secondary frame to the tertiary frame. Where different primary frame rates may be used, the sum of (A/P) plus (P/S)F1 plus (S/T)F2 is minimized to find primary and secondary frame rates which will permit an optimally small total frame length, given the sub-aggregate rate A.

20 Claims, 6 Drawing Sheets

| CHANNEL RATES | COMMON CHANNEL FACTORS |||||||||||||| 
|---:|:-:|:-:|:-:|:-:|:-:|:-:|:-:|:-:|:-:|:-:|:-:|:-:|:-:|:-:|
| | 8k | 4k | 2k | 1.6k | 1k | 800 | 500 | 400 | 250 | 200 | 125 | 100 | 50 | 25 |
| 75 | | | | | | | | | | | | | 1 | 1 |
| 100 | | | | | | | | | | | | 1 | | |
| 150 | | | | | | | | | | | | 1 | | 1 |
| 200 | | | | | | | | | | | 1 | | | |
| 300 | | | | | | | | | | 1 | | 1 | | |
| 400 | | | | | | | | 1 | | | | | | |
| 600 | | | | | | | 1 | | | | | 1 | | |
| 800 | | | | | | 1 | | | | | | | | |
| 900 | | | | | | 1 | | | | | | 1 | | |
| 1000 | | | | | 1 | | | | | | | | | |
| 1200 | | | | | 1 | | | | | 1 | | | | |
| 1600 | | | | 1 | | | | | | | | | | |
| 1800 | | | | 1 | | | | | | 1 | | | | |
| 2000 | | | 1 | | | | | | | | | | | |
| 2400 | | | 1 | | | | | 1 | | | | | | |
| 3200 | | | 1 | | | | | | | 1 | | | | |
| 3600 | | | 1 | 1 | | | | | | | | | | |
| 4000 | | 1 | | | | | | | | | | | | |
| 4800 | | 1 | | | | | | 1 | | | | | | |
| 6000 | | 1 | 1 | | | | | | | | | | | |
| 6400 | | 1 | 1 | | | | | 1 | | | | | | |
| 7200 | | 1 | 1 | | 1 | | | | | | | 1 | | |
| 8000 | 1 | | | | | | | | | | | | | |
| 9600 | 1 | | | 1 | | | | | | | | | | |
| 12000 | 1 | 1 | | | | | | | | | | | | |
| 12800 | 1 | 1 | | | | 1 | | | | | | | | |
| 14000 | 1 | 1 | 1 | | | | | | | | | | | |
| 14400 | 1 | 1 | 1 | | | | | 1 | | | | | | |
| 16000 | 2 | | | | | | | | | | | | | |
| 16800 | 2 | | | | | 1 | | | | | | | | |
| 19200 | 2 | | 1 | | 1 | | | | | 1 | | | | |
| 24000 | 3 | | | | | | | | | | | | | |
| 25000 | 3 | | | | | 1 | | | | | | | | |
| 25600 | 3 | | | 1 | | | | | | | | | | |
| 28000 | 3 | 1 | | | | | | | | | | | | |
| 28800 | 3 | 1 | | | | 1 | | | | | | | | |
| 32000 | 4 | | | | | | | | | | | | | |

FIG. 2a

```
CHANNEL    COMMON CHANNEL FACTORS
RATES      8k  4k  2k  1.6k  1k  800  500  400  250  200  125  100  50  25

```
AGGREGATE = 64K 8000   1600   800   400   200   100   50   25

CH1  = 19.2K    2     2     -     -     -     -    -    -

CH2  = 19.2K    2     2     -     -     -     -    -    -

CH3  = 14.4K    1     4     -     -     -     -    -    -

CH4  = 3600     -     2     -     1     -     -    -    -

CH5  = 2400     -     1     1     -     -     -    -    -

CH6  = 2400     -     1     1     -     -     -    -    -

CH7  = 600      -     -     -     1     1     -    -    -

CH8  = 300      -     -     -     -     1     1    -    -

CH9  = 300      -     -     -     -     1     1    -    -

CH10 = 75       -     -     -     -     -     -    1    1
─────────────
TOT  = 62,475

UNUSED = 1525   -     -     1     1     1     1    -    1
─────────────────────────────────────────────────────────
TOT  = 64,000   5    12     3     3     4     3    1    2
```

FIG. 3a

| PR. RATE | PR.LEN. | SEC. RATE | SEC. LEN. | TER. RATE | TER. LEN. | TOT.LEN |
|---|---|---|---|---|---|---|
| 8K | $\frac{64K}{8K}=8$ | 1.6K | $\left[\frac{24K}{8K}\right]\left[\frac{8K}{1600}\right]=15$ | 25 | $\left[\frac{4800}{1600}\right]\left[\frac{1600}{25}\right]=192$ | 215 |
| 8K | $\frac{64K}{8K}=8$ | 800 | $\left[\frac{24K}{8K}\right]\left[\frac{8K}{1600}\right]=30$ | 25 | $\left[\frac{2400}{800}\right]\left[\frac{800}{25}\right]=96$ | 134 |
| 8K | $\frac{64K}{8K}=8$ | 400 | $\left[\frac{24K}{8K}\right]\left[\frac{8K}{1600}\right]=60$ | 25 | $\left[\frac{1200}{400}\right]\left[\frac{400}{25}\right]=48$ | 116 |
| 8K | $\frac{64K}{8K}=8$ | 200 | $\left[\frac{24K}{8K}\right]\left[\frac{8K}{1600}\right]=120$ | 25 | $\left[\frac{400}{200}\right]\left[\frac{200}{25}\right]=16$ | 144 |
| 8K | $\frac{64K}{8K}=8$ | 100 | $\left[\frac{24K}{8K}\right]\left[\frac{8K}{100}\right]=240$ | 25 | $\left[\frac{100}{100}\right]\left[\frac{100}{25}\right]=4$ | 252 |
| 8K | $\frac{64K}{8K}=8$ | 50 | $\left[\frac{24K}{8K}\right]\left[\frac{8K}{50}\right]=480$ | 25 | $\left[\frac{50}{50}\right]\left[\frac{50}{25}\right]=2$ | 490 |

FIG. 3b

| PR. RATE | PR. LEN. | SEC. RATE | SEC. LEN. | TER. RATE | TER. LEN. | TOT. LEN |
|---|---|---|---|---|---|---|
| 1600 | $\frac{64K}{1600} = 40$ | 800 | $\left[\frac{4800}{1600}\right]\left[\frac{1600}{800}\right] = 6$ | 25 | $\left[\frac{2400}{800}\right]\left[\frac{800}{25}\right] = 96$ | 146 |
| 1600 | $\frac{64K}{1600} = 40$ | 400 | $\left[\frac{4800}{1600}\right]\left[\frac{1600}{400}\right] = 12$ | 25 | $\left[\frac{1200}{400}\right]\left[\frac{400}{25}\right] = 48$ | 100 |
| 1600 | $\frac{64K}{1600} = 40$ | 200 | $\left[\frac{4800}{1600}\right]\left[\frac{1600}{200}\right] = 24$ | 25 | $\left[\frac{400}{200}\right]\left[\frac{200}{25}\right] = 16$ | 80 |
| 1600 | $\frac{64K}{1600} = 40$ | 100 | $\left[\frac{4800}{1600}\right]\left[\frac{1600}{100}\right] = 48$ | 25 | $\left[\frac{100}{100}\right]\left[\frac{100}{25}\right] = 4$ | 92 |
| 1600 | $\frac{64K}{1600} = 40$ | 50 | $\left[\frac{4800}{1600}\right]\left[\frac{1600}{50}\right] = 96$ | 25 | $\left[\frac{50}{50}\right]\left[\frac{50}{25}\right] = 2$ | 138 |

FIG. 3C

FRAMING ALGORITHM FOR BIT INTERLEAVED TIME DIVISION MULTIPLEXER

BACKGROUND

This invention generally relates to a framing algorithm for a bit interleaved time division multiplexer (TDM), and more particularly to as efficiency maximizing framing algorithm for a bit interleaved TDM which is compatible with a digital access cross-connect system (DACS).

The process of "framing", as known to those skilled in the art, is the process or mechanism of multiplexing a number of channels of varied rates onto a single aggregate line with proportional time allocation. The task undertaken by the framing mechanism is the time division and programming for a "framing RAM" hardware such that the hardware can continuously and periodically repeat a set of instructions. For example, if three channels having rates of 1200, 2400, and 4800 baud are to be multiplexed onto an aggregate line of 9600 baud, in accord with techniques known in the art, a common factor between the channel rates (the least common denominator) may be found, and this common factor will determine the length of the frame (or "frame length"). In the provided example, the common factor would be 1200, as each channel is divisable by that number. Thus, the 9600 aggregate line would have eight slots (9600/1200): one slot (1200/1200) being occupied by the 1200 baud channel; two slots (2400/1200) by the 2400 baud channel; and four (4800/1200) slots by the 4800 baud channel. The extra slot could be used for various purposes such as null data, synchonization, etc.

If additional channels having baud rates of 75 and 400 were added to the stated example, the aggregate line could accommodate them, as 1200 baud was unused. However, it will be appreciated that the least common denominator instead of being 1200, would drop to 25. Thus, the 9600 aggregate would be divided into 384 slots (i.e. 9600/25) as opposed to original 8 slots.

In reality, aggregates as high as 2.048MHz are common, with least common denominators of 25 Hz being common. As a result, a frame could have 81,920 slots with the same number of associated words being located in the frame RAM. Clearly, such a large memory would be disadvantageous both from an economic and a processing viewpoint. In response to this problem, a mechanism of repeating and "non-repeating" (also known as frames and superframes, or subframe and frames) which is discussed in commonly-owned U.S. Pat. No. 4,727,536 has been set forth to keep the frame length down. Thus, in the above-provided example, a repeating frame rate of 600 Hz could be utilized so that the frame would have sixteen slots (9600/600) while a superframe of 25 Hz could be utilized to muliplex the 75 Hz and 400 Hz channels onto the 600 Hz repeating frame. The superframe would have twenty-four slots, for a total of forty RAM frame words instead of the 384 previously required.

While the previously provided techniques have proved advantageous, there still exists an uncertainty as to selecting the repeating frame rate. For instance, while 600 Hz was chosen in the above example, it is possible that 800 or 1200 Hz would have been a better rate, at least in terms of minimizing frame RAM length. Moreover, in many framing algorithms of the art, where an attempt at framing fails due to the unavailability of enough RAM, the lowest rate channel is deleted and another framing is attempted. However, as will be appreciated by those skilled in the art after review of the instant disclosure, it is possible that by including a plurality of subframes (e.g. secondary and tertiary frames), and by optimizing the frame rates, that a given circumstance which would have given rise to a framing failure, can be accommodated.

SUMMARY OF THE INVENTION

It is therefore an object of the invention to provide a framing algorithm which determines optimal frame rates at which a plurality of channels of diverse rates are multiplexed onto a time division multiplexed aggregate or sub-aggregate such that the frame RAM required to store the framing information is kept to a minimum.

It is a further object of the invention to provide a framing algorithm which provides optimal frame rates for a plurality of frames in a one pass method.

It is another object of the invention to provide a framing algorithm which provide in a simple and straight-forward manner optimal frame rates for a primary frame, a secondary frame, and a tertiary frame.

It is yet a further object of the invention to provide a framing algorithm for multiplexing a plurality of channels onto a DACS network.

It is yet another object of the invention to provide a framing algorithm utilizing a plurality of frames wherein the frame RAM required to store the framing information is kept to a minimum.

In accord with the objects of the invention, a method for determining optimal frame rates so that a plurality of channels may be efficiently multiplexed onto a sub-aggregate of an aggregate line is provided and comprises:

(a) obtaining the data rates of said channels, and expressing each of said channel data rates as a sum of a plurality of predetermined subchannel data rates;

(b) accumulating the number of times each predetermined subchannel data rate is used to express said channel data rates, wherein the lowest predetermined subchannel data rate having an accumulated positive number is chosen as a tertiary frame rate (T); and (c) given a predetermined sub-aggregate rate (A) and said data rates expressed as a sum of a plurality of predetermined subchannel data rates, determining suitable primary (P) and secondary (S) frame rates by finding and minimizing for a plurality of primary and secondary frame rates the sum of (1) A/P, (2) (P/S)F1 where F1 is the number of calls of the primary frame to the secondary frame; and (3) (S/T)F2 where F2 is the number of calls of the secondary frame to the tertiary frame.

where the aggregate line is part of a DACS system, the primary frame rate is preferably chosen as 8 Khz (i.e. one bit of a DS1 frame) so that each 8 Khz component can be mapped onto a DS1 frame. The tertiary rate is often chosen to be 25 hz as the 25 hz rate is a common greatest common denominator rate for many of the common data rates. With an 8 Khz primary frame rate and a 25 hz tertiary frame rate, common secondary frame rates include 800 hz and 1.6 Khz. Regardless of the secondary frame rate, with the fixed primary and tertiary rates, the time and calculations required to "frame up" are kept very small.

In choosing the subchannel rates, account must be taken of all the possible standard channel rates as well as the aggregate rate. In reviewing the standard rates of today, at least two families of subchannel rates present themselves: 25 times 2 to the n power, where n is an integer greater than or equal to zero; and 125 times 2 to the n power. In optimizing the frame length, each of the subchannel rate families can be used for the predetermined subchannel data rates, and the determined total use of RAM length for each family can be compared. Also, if desired, the subchannel rate families may be combined, or at least a basic rate (e.g. 25 hz) may be used as a base for the 125 times 2 to the n power family to further optimize the frame length.

Preferably, prior to arranging and determining the primary, secondary, and tertiary frames, the total bandwidth requested by all the channels to be multiplexed is summed and subtracted from the available sub-aggregate bandwidth to provide a determination of the unused bandwidth. The unused bandwidth is then expressed as a sum of the predetermined subchannel data rates. Also, preferably, each predetermined subchannel data rate is a multiple factor of the others. Where a channel does not have a standard bandwidth which can be expressed as a sum of the predetermined subchannel data rates, the bandwidth for the non-standard channel is preferably rounded to the next highest standard channel rate so that a proper determination of the optimal primary and secondary frame rates can proceed.

Further, if desired, further frames such as fourth and fifth frames might be utilized for frame length optimization. Practically, however, utilization of additional frame RAMS beyond the primary, secondary, and tertiary becomes unviable due to the time required to access additional layers of frame.

Other objects and advantages of the invention will become evident upon reference to the detailed description in conjunction with the provided figures.

BRIEF DESCRIPTION OF THE DRAWINGS

FIGS. 2a and 2b are charts showing common channel rates and thier relationship to a plurality of common subchannel data rates;

FIG. 3a is a chart relating a set of example channels to a subset of common subchannel data rates;

FIG. 3b is a chart showing the relationship of primary, secondary and tertiary frame rates with primary, secondary and tertiary frame lengths using the example of FIG. 3a, and providing a one pass optimal solution in terms of total frame RAM; and FIG. 3c is a chart showing the relationship of primary, secondary and tertiary frame rates using the example of FIG. 3a, which together with FIG. 3b indicates a one pass optimal solution in terms of total frame RAM where both the primary and secondary frame rates may vary.

DETAILED DESCRIPTION OF THE PREFERRED EMBODIMENT

Figure 1:
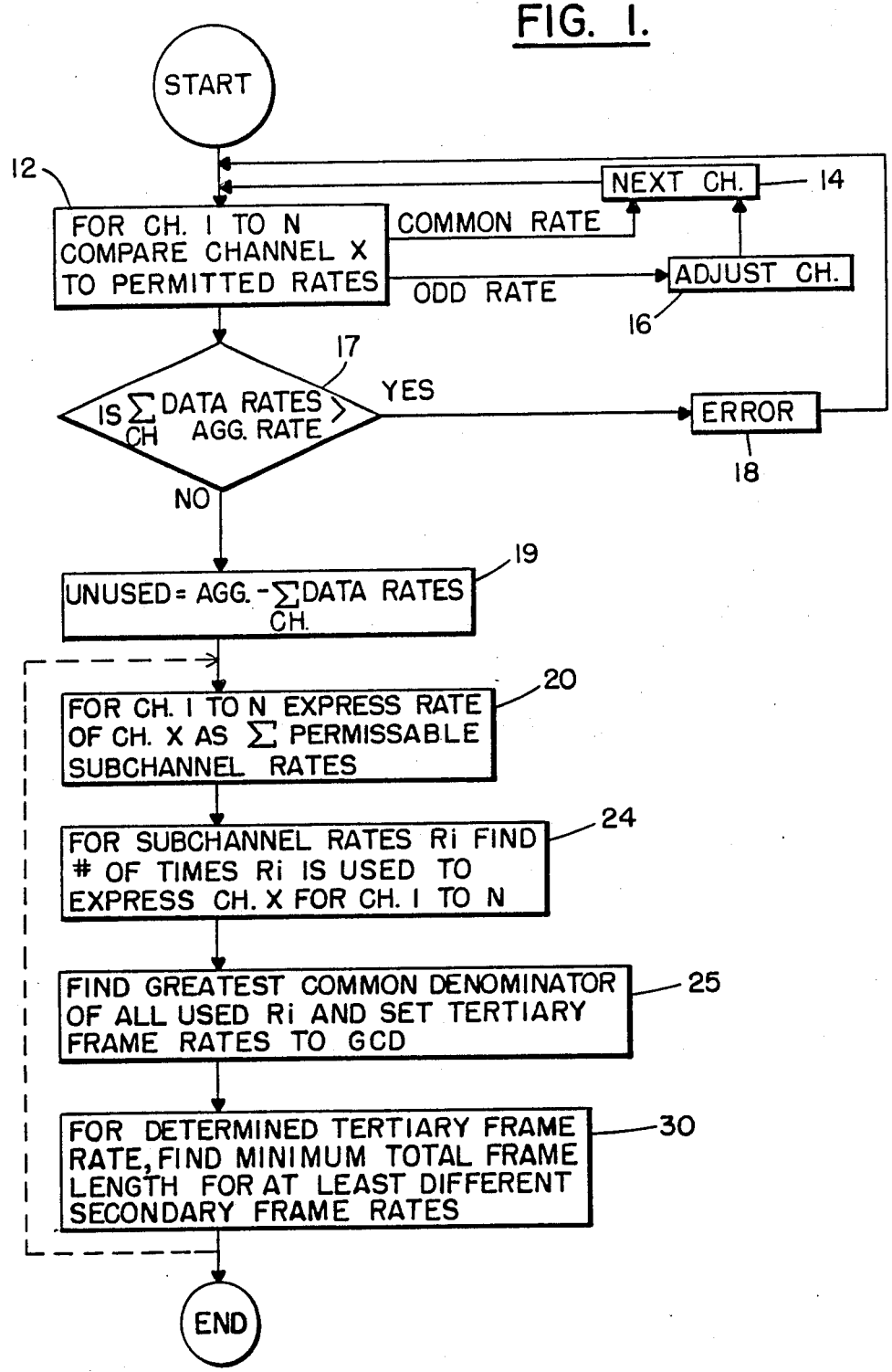
FIG. 1 is a flow diagram of the framing algorithm method of the invention.

In providing any framing algorithm for a multiplexer, several conditions must always be satisfied. For example, the total bandwidth of the channels being multiplexed may never exceed the bandwidth of the aggregate line onto which they are being multiplexed. Also, the total frame length(s) must not exceed the amount of memory available to store the frame information. Further, the number of times a channel is called in a frame should always be an integer number; i.e. the frame rate divided by the channel rate should be an integer number. Starting with these conditions or constraints, it is clearly beneficial to have a framing algorithm which both minimizes total frame length and which is quickly determinable.

Turning to FIG. 1, the preferred method for efficiently multiplexing a plurality of channels onto a sub-aggregate of an aggregate line is provided in flow chart form. At 12, (and 14), each channel rate is compared to a list of permissable common channel rates (seen in FIGS. 2a and 2b) to determine whether the channel rate appears in that list. If the channel rate is not a common rate (i.e. it does not have a standard bandwidth which can be expressed as a sum of certain predetermined subchannel data rates), the bandwidth for the non-standard channel is preferably rounded to the next highest standard channel rate at 16.

With each channel now guaranteed to have a standard rate, at 17 the sum of the data rates is checked to make sure that the aggregate rate is not exceeded. If the aggregate rate is exceeded, an error message is provided at 18 and the user is returned to the start of the program. If the aggregate rate is not exceeded, excess bandwidth is calculated at 19. Then at 20, each channel (the excess bandwidth being treated as a channel) is expressed as a sum of a plurality of predetermined subchannel data rates. The breaking down of each channel rate may be accomplished either by reference to a look-up chart such as is shown in FIGS. 2a and 2b, or by division of the channel rate by predetermined values.

As shown in FIGS. 2a and 2b, almost all common channel rates (e.g. 75, 100, 150, 200, 300, 400, 600, 800, . . .) may be expressed as the sum of one or more common subchannel factors (25, 50, 100, 125, 200. . .) In fact, in reviewing the common channel rates of today, it should be appreciated that the channel rates may be expressed as the sum of 25 times 2 to the n power, where n is an integer greater than or equal to zero, plus 125 times 2 to the n power. Thus, two families of subchannel rates immediately present themselves for use: 25 times 2 to the n power, and 125 times 2 to the n power. A third family might by 75 times 2 to the n power. As will be seen hereinafter, depending on the circumstances, one or more of the families might be combined. Or, depending on the channel rates of the channels to be multiplexed, all channels may be able to be expressed with rates from one or more single family. Regardless, it will be appreciated that since 25 Hz is the basic lowest common denominator of all common channel rates, the 25 times 2 to the n power family is a convenient family of subchannel rates. Also, where the aggregate line is part of a DACS system, a subchannel rate of 8 Khz (i.e. one bit of a DS1 frame) is preferably chosen as a subchannel rate so that each 8 Khz component can be mapped onto a DS1 frame.

An example of step 20 where a channel is broken down into predetermined subchannel data rates is seen in FIG. 3a, where the predetermined subchannel data rates are chosen as the 25 times 2 to the n Hz family (up to 1600), and 8000 Hz. Several channels of differing data rates are indicated which are to be multiplexed onto an aggregate line of 64 kHz (a DS0 byte). In accord with step 14, an unused (idle) bandwidth of 1525 Hz is indicated. As indicated in FIG. 3a, channel 3 which requires a bandwidth of 14.4 kHz is broken down into one 8000 Hz segment, and four 1600 Hz segments. Channel 7, which requires a bandwidth of 600 Hz, is broken down into one 400 Hz and one 200 Hz segment. The other channels are also broken down accordingly.

Returning to FIG. 1, and in accord with the preferred embodiment of the invention, once all channels have been broken down into their subchannel components, the subchannel components are accumulated at 24 (as indicated in FIG. 3a); i.e. a determination is made as to the total number of times each predetermined subchannel data rate was used in the expression of all of the channel data rates. Then, at 25 the greatest common denominator of the utilized subchannel rates is chosen as a tertiary frame rate. Of course, where all of the subchannel rates are of the same family, the greatest common denominator will be the lowest rate utilized. However, where subchannels of different families are utilized, the greatest common denominator must be found.

Where the multiplexer to be framed is to be DACS compatible, the primary frame rate is preferably chosen to be 8 kHz because each 8 kHz component may be mapped as one bit onto a DS1 frame as aforementioned. With the primary frame rate and tertiary frame rate chosen, a determination is made at 30 as which subchannel rate between the two may be optimally chosen as a secondary frame rate. In accord with the best mode of the invention, this determination may be made in a single pass. Thus, as seen in FIG. 3b, determinations are made for each intermediate subchannel rate as follows: the secondary frame length given the primary frame rate, the particular secondary frame rate, and the total channel bandwidth less than the primary frame rate; the tertiary frame length given the particular secondary frame rate, the determined tertiary frame rate, and the total channel bandwidth less than the particular secondary frame rate; and the sum of the secondary and tertiary (and primary, if desired) frame lengths for that particular secondary frame length. For example, in FIG. 3B, the total of the frame lengths for a primary frame rake of 8K, a secondary rate of 800 Hz, and a tertiary rate of 25 Hz was calculated as follows. The length of the primary frame (which is constant for any given primary rate) is equal to the aggregate rate 64K divided by the primary rate 8K; 64K/8K=8. The length of the secondary frame is equal to the primary rate 8K divided by the secondary rate (here 800), times the number of calls from the primary frame to the secondary frame. With the channels of FIG. 3A, three such calls must be made. This is seen either by recognizing that the primary frame length is eight but that only five 8K components are available (see FIG. 3A totals), or by summing the rates of components less than 8K (in this case 24K) and dividing by 8K; 24K/8K=3. Thus, as seen in FIG. 3B for the secondary rate of 800 Hz, the secondary frame length is set equal to the primary rate divided by the secondary rate 8K/800 times the number of calls 24K/8K; yielding a product of 30. The tertiary frame length is similarly calculated as the secondary frame rate (800) is divided by the tertiary frame rate (25) times the number of calls (2400/800); yielding a product of 96. The sum of the primary, secondary, and tertiary frame lengths is then the sum 8+30+96=134.

By comparing the sum of the primary, secondary, and tertiary frame lengths required due to the choice of different secondary frame rates, a minimum can be found (as highlighted in FIG. 3B), and that minimum is considered the optimal solution. In fact, calculations need not be carried out for all subchannel rates intermediate the primary and tertiary frame rates, as once a local minimum is found, it may be shown that the rate associated with the local minimum is the optimal rate. In other words, by comparing the total frame length sum for a first secondary frame rate as opposed to a second secondary frame rate, if the frame length sum for the second secondary frame rate is less, the calculations must be repeated to compare the second against a third secondary frame rate. However, if the sum of the frame lengths for the third secondary frame rate is greater than the frame length sum for the second secondary frame rate, the second secondary frame rate is determined as optimal, and no further calculations are required. Thus, for the example of FIGS. 3A and 3B, it will be appreciated that after calculating secondary and tertiary frame lengths for a secondary frame rate of 200 Hz, it would not be necessary to conduct additional calculations for secondary frame rates of 100 and 50 Hz.

As previously indicated, the secondary and tertiary frame lengths are not simply determined by dividing the primary frame rate by the secondary frame rate and the secondary frame rate by the tertiary frame rate respectively. Rather, the frame lengths might be a multiple of such quotients as the primary frame might have to call the secondary frame (or the secondary frame might have to call the tertiary frame) more than once due to the large number of low-rate channels. Thus, for the channels of FIG. 3A, and as indicated in FIG. 3B, three calls in the primary frame to the secondary frame would be required where the primary rate is set at 8 Khz. Likewise, depending on the secondary rate, either three, two, or one calls would be made by the secondary frame to the tertiary frame. For the optimal case of secondary rate of 400 Hz, three such calls would be required.

While for a DACS compatible multiplexer having a primary frame rate of 8 Khz (a DS1 bit), a single pass technique for finding an "optimal" secondary frame rate is extremely advantageous, it will be appreciated by those skilled in the art that where the primary frame rate is not set, optimal solutions having an even smaller total frame length are possible. Thus, different primary rates can each be analyzed for a multiple of different secondary rates, and the best solution can be found. For example, using the channels and aggregate examples of FIG. 3A, if a primary frame rate of 1600 Hz is utilized as indicated in FIG. 3C, a minimization of total frame length (eighty slots) occurs with a secondary frame rate of 200 Hz.

While additional primary frame rates of 800 Hz and less can also be tested, those skilled in the art will appreciate that the total frame length of eighty slots for all three frames found for the primary rate of 1600 Hz and secondary frame rate of 200 Hz is a minimum. This is apparent from the fact that at an aggregate rate of 64 Khz, any primary frame rate of 800 Hz or less requires at least eighty slots for the primary frame alone.

Further optimization beyond that indicated by FIGS. 3B and 3C can be obtained by creating a quaternary frame with a fourth frame rate, and even further frames with their own frame rates, and solving for rates which would minimize the total frame length. However, while the provision of additional subframes minimizes the total frame RAM required, the circuitry and timing required for such additional frames would greatly complicate any multiplexer using the same and would render such a multiplexer less effective and more costly given the present technology.

While the channel rates of FIG. 3A were expressed as the sum of predetermined subchannel rates of the group 25 times 2 to the n power (up until 1600) plus an 8K subchannel rate, those skilled in the art will appreciate that the other groups of predetermined subchannel rates could be utilized. For example, all subchannel rates might be chosen so that they belong to a single group; e.g. 25 or 75 or 125 times 2 to the n power. Or, if desired, a mix of different groups may be chosen. If a mix of different groups is chosen, it is greatly preferable that the group families have a significant least common denominator (e.g. 25 Hz). Regardless, the aggregate must be divisible by the primary frame rate, the primary frame rate must be divisible by the secondary frame rate, and the secondary frame rate must be divisible by the tertiary frame rate. It should be appreciated that with the use of different families of subchannel rates, it is possible to further minimize the total frame RAM requirements as the optimal solutions for the different subchannel rate families or family combinations can be themselves compared to find a minimum.

There has been described and illustrated herein methods for multiplexing a plurality of channels of diverse rates onto a time division multiplexed aggergate or sub-aggregate wherein the frame RAM required for storing the framing information is minimized taking into account the system requirements. While particular embodiments of the invention have been described it is not intended that the invention be limited thereto as it is intended that the invention be as broad in scope as the art will allow. Thus, while the particular example provided in FIG. 3A required a tertiary rate of 25 Hz, for other combinations of channel rates, a greatest common denominator of 50 or 100 Hz or greater might be available. Also, while a particular aggregate and group of subchannel rates were specified, other aggregate rates might better utilize a different group of subchannel rates as will be well appreciated by those skilled in the arts.

It will further be appreciated, that while the total frame length was described as being the sum of the primary, secondary, and tertiary frame lengths, where the primary rate is preset (e.g. as DS0 bit = 8 Khz), the primary frame length is a constant. Thus, in conducting a one pass minimization determination, only the sum of the secondary and tertiary frame lengths need be calculated and compared. In fact, depending on the coding and the arrangement in RAM (e.g. a bit is used with each word to point to which frame the next word is located), a word of RAM might not be required for each call of a superior frame (e.g. primary) to an inferior (e.g. secondary) frame. As a result, the total frame RAM length, rather than being a straight sum of the frame lengths calculated as in FIG. 3B, would subtract out the number of calls to inferior frames from the total. For example, the optimal solution of FIG. 3C would require five fewer words, as the three calls from the primary to the secondary frame, and the two calls from the secondary to the tertiary frame would not require words in RAM. Further, in calculating the secondary frame lengths for different secondary rates, it will be appreciated that for a given primary frame rate the secondary frame length will double for each halving of the secondary frame rate. Thus, actual direct calculation of the secondary frame length for each secondary rate is unnecessary. Likewise, in calculating the secondary and tertiary frame lengths, many different approaches are possible. For example, instead of calculating the tertiary frame length by dividing the secondary rate by the tertiary rate, and multiplying the value by the sum of the subchannel components less than the secondary rate divided by the secondary rate, an example of a more direct calculation would be: the sum of the subchannel components less than said secondary frame rate divided by the tertiary rate. Therefore, it will be apparent to those skilled in the art that other changes and modifications may be made to the invention as described without departing from the spirit and scope of the invention as so claimed.

I claim:

1. A method for determining optimal frame rates so that a plurality of channels are efficiently multiplexed onto a sub-aggregate of an aggregate line, comprising:
   (a) obtaining data rates of said channels, and expressing each of said channel data rates as a sum of a plurality of predetermined subchannel dates rates;
   (b) accumulating the number of times each predetermined subchannel date rate is used to express said channel data rates over said plurality of channels, wherein a greatest common denominator of said predetermined subchannel data rates having an accumulated positive number is chosen as a tertiary frame rate (T); and
   (c) given a predetermined sub-aggergate rate (A) and said channel data rates expressed as a sum of a plurality of predetermined subchannel date rates, determining suitable primary (P) and secondary (S) frame rates by finding and minimizing for a plurality of primary and secondary frame rates a sum of
   (1) A/P,
   (2) (P/S)F1 where F1 represents a number of calls of a primary frame of frame rate P to a secondary frame of frame rate S, and
   (3) (S/T)F2 where F2 represents a number of calls of said secondary frame of frame rate S to a tertiray frame of frame rate T.

2. A method according to claim 1, wherein:
said predetermined subchannel data rates are all chosen from a family of rates chosen from one of the families 25 times 2 to the n power Hz, 75 times 2 to the n power Hz, and 125 times 2 to the n power Hz.

3. A method according to claim 1, wherein:
said predetermined subchannel data rates are chosen from at least one family of rates chosen from 25 times 2 to the n power Hz, 75 times 2 to the n power Hz, and 125 times 2 to the n power Hz.

4. A method according to claim 1, further comprising:
   (d) summing said data rates of said channels to provide a total rate sum; and
   (e) subtracting said total rate sum from said sub-aggregate rate and expressing a positive difference as unused bandwidth,
   wherein said unused bandwidth is thereafter treated as any other of said plurality of channels.

5. A method according to claim 1, further comprising:
   (d) finding an odd channel whose rate cannot be expressed as a sum of said plurality of predetermined subchannel data rates; and
   (e) allocating additional bandwidth to said odd channel so that said odd channel can be expressed as a sum of said plurality of predetermined subchannel data rates, wherein said odd channel with additional bandwidth is thereafter treated as any other of said plurality of channels.

6. A method according to claim 5, further comprising:
(f) summing said data rates of said channels to provide a total rate sum; and
(g) subtracting said total rate sum from said sub-aggregate rate and expressing a positive difference as unused bandwidth,
wherein said unused bandwidth is thereafter treated as any other of said plurality of channels.

7. A method according to claim 6, wherein:
said predetermined subchannel data rates are chosen from at least one family of rates chosen from 25 times 2 to the n power Hz, 75 times 2 to the n power Hz, and 125 times 2 to n power Hz.

8. A method according to claim 1, wherein:
in finding and minimizing said sum of (1), (2), and (3), finding a local minimum of (2) plus (3) for each primary rate P, and comparing said local minima to provide a primary frame rate and a secondary frame rate which will require a minimum total frame length for primary, secondary, and tertiary frames required in multiplexing said plurality of channels.

9. A one pass method for determining optimal frame rates so that a plurality of channels are efficiently multiplexed onto a sub-aggregate of an arregate line comprising:
(a) obtaining data rates of said channels, and expressing each of said channel data rates as a sum of a plurality of predetermined subchannel data rates;
(b) accumulating the number of times each predetermined subchannel data rate is used to express said channel data rates over said plurality of channels, wherein a greatest common denominator of said predetermined subchannel data rates having an accumulated positive number is chosen as a tertiary frame rate (T); and
(c) given a predetermined frame rate (P), and said channel data rates expressed as a sum of a plurality of predetermined subchannel date rates, determining an efficient secondary (S) frame rate by finding and minimizing for a plurality of secondary frame rates a sum of at least
(1) $((P/S)+r)F1$ where F1 represents a number of calls of a primary frame of frame rate P to a secondary frame of frame rate S and r is a variable chosen based on a method of storing framing information; and
(2) $((S/T)+r)F2$ where F2 represents a number of calls of said secondary frame of frame rate S to a tertiary frame of frame rate T which equals a sum of each predetermined subchannel data rate less than said secondary frame rate times respective accumulated numbers for each predetermined subchannel data rate divided by said secondary frame rate.

10. A one pass method according to claim 9, wherein:
said primary frame rate is chosen to be 8 Khz.

11. A one pass method according to claim 10, wherein:
said predetermined subchannel data rates are chosen from at least one family of rates chosen from 25 times 2 to the n power Hz, 75 times 2 to the n power Hz, and 125 times 2 to the n power Hz.

12. A method according to claim 9, further comprising:
(d) summing said data rates of said channels to provide a total rate sum; and
(e) subtracting said total rate sum from said sub-aggregate rate and expressing a positive difference as unused bandwidth,
wherein said unused bandwidth is thereafter treated as any other of said plurality of channels.

13. A method according to claim 9, further comprising:
(d) finding an odd channel whose rate cannot be expressed as a sum of said plurality of predetermined subchannel date rates; and
(e) allocating additional bandwidth to said odd channel so that said odd channel can be expressed as a sum of said plurality of predetermined subchannel date rates,
wherein said odd channel with additional bandwidth is thereafter treated as any other of said plurality of channels.

14. A method according to claim 13, further comprising:
(f) summing said data rates of said channels to provide a total rate sum; and
(g) subtracting said total rate sum from said sub-aggregate rate and expressing a positive difference as unused bandwidth,
wherein said unused bandwidth is thereafter treated as any other of said plurality of channels.

15. A method according to claim 14, wherein:
said primary frame rate is chosen as 8 Khz, and said predetermined subchannel data rates are chosen from at least one family of rates chosen from 25 times 2 to the n power Hz, 75 times 2 to the n power Hz, and 125 times 2 to the n power Hz.

16. A method according to claim 9, wherein:
in finding and minimizing said sum of (1) and (2), finding a local minimum of (1) plus (2).

17. A method according to claim 9, wherein:
r is chosen as zero.

18. A method according to claim 9, wherein:
r is chosen as one.

19. A method for determining optimal frame rates so that a plurality of channels are efficiently multiplexed onto a sub-aggregate of an aggregate line, comprising:
(a) obtaining data rates of said channels, and expressing each of said channel data rates as a sum of a plurality of predetermined subchannel data rates;
(b) accumulating the number of times each predetermined subchannel data rate is used to express said channel data rates over said plurality of channels, wherein a greatest common denominator of said predetermined subchannel data rates having an accumulated positive number is chosen as a tertiary frame rate (T);
(c) given a predetermined sub-aggregate rate (A) and said channel data rates expressed as a sum of a plurality of predetermined subchannel data rates, determining suitable primary (P) and secondary (S) frame rates by finding and minimizing for a plurality of primary and secondary frame rates a sum of
(1) $A/P$,
(2) $((P/S)+r)F1$ where F1 represents a number of calls of a primary frame of frame rate P to a secondary frame of frame rate S and r is a variable based on a method of storing framing information, and (3) $((S/T)+r)F2$ where F2 represents a number of calls of said secondary frame of frame rate S to a tertiary frame of frame rate T;

(d) repeating steps (a)–(c) for at least one second plurality of predetermined subchannel rates including at least one different predetermined subchannel rate; and (e) comparing respective minimum sums determined at step (c) for said each plurality of predetermined subchannel rates to find a minimum of said minimum sums.

20. A method according to claim 19, wherein:

in finding and minimizing said sum of (1) plus (2) plus (3) for each plurality of predetermined subchannel rates, finding a local minimum of (1) plus (2) plus (3).

* * * * *